(12) United States Patent
Choudhary et al.

(10) Patent No.: US 10,057,285 B2
(45) Date of Patent: Aug. 21, 2018

(54) SYSTEM AND METHOD FOR AUDITING GOVERNANCE, RISK, AND COMPLIANCE USING A PLUGGABLE CORRELATION ARCHITECTURE

(75) Inventors: Usman Choudhary, Springfield, VA (US); John Melvin Antony, Herndon, VA (US); Michael Howard Cooper, Washington, DC (US); Pattabiraman Srinivasan, Gaithersburg, MD (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 918 days.

(21) Appl. No.: 12/424,428

(22) Filed: Apr. 15, 2009

(65) Prior Publication Data

US 2010/0198636 A1  Aug. 5, 2010

Related U.S. Application Data

(60) Provisional application No. 61/148,557, filed on Jan. 30, 2009.

(51) Int. Cl.
*H04L 29/06* (2006.01)
*G06F 21/55* (2013.01)
*G06Q 10/06* (2012.01)

(52) U.S. Cl.
CPC ........ *H04L 63/1433* (2013.01); *G06F 21/552* (2013.01); *G06F 21/554* (2013.01); *G06Q 10/06* (2013.01); *G06Q 10/0635* (2013.01)

(58) Field of Classification Search
USPC ................. 705/1.1; 715/757, 736; 714/47.1
See application file for complete search history.

(56) References Cited

U.S. PATENT DOCUMENTS

| | | | |
|---|---|---|---|
| 5,630,069 A | 5/1997 | Flores et al. | 395/207 |
| 5,657,245 A | 8/1997 | Hecht et al. | 364/505 |
| 6,205,407 B1 | 3/2001 | Testa et al. | 702/119 |
| 6,208,720 B1 | 3/2001 | Curtis et al. | |
| 6,618,766 B1 | 9/2003 | Eshghi | 709/318 |
| 6,779,120 B1 | 8/2004 | Valente et al. | 713/201 |
| 6,792,456 B1 | 9/2004 | Hellerstein et al. | 709/224 |
| 6,807,583 B2 | 10/2004 | Hrischuk et al. | 709/318 |
| 6,839,850 B1 | 1/2005 | Campbell et al. | 713/201 |
| 6,850,820 B2 | 2/2005 | Tajima | 700/286 |
| 6,886,102 B1 | 4/2005 | Lyle | 713/201 |
| 6,983,221 B2 | 1/2006 | Tracy et al. | 702/181 |

(Continued)

*Primary Examiner* — Jan P Mincarelli
(74) *Attorney, Agent, or Firm* — Kilpatrick Townsend & Stockton LLP (57) ABSTRACT

Described herein is a system and method for auditing governance, risk, and compliance using an event correlation architecture. In particular, the event correlation architecture may include a solution designer for defining a solution pack that enforces one or more specific governance, risk, or compliance controls, and a solution manager for deploying the solution pack within the event correlation architecture to configure the architecture for enforcement of the one or more controls. Thus, a collection of content defined in the solution pack may be used to enrich one or more events received at the event correlation architecture, and a correlation engine may then correlate the events using the content in the solution pack to enforce the one or more governance, risk, or compliance controls.

9 Claims, 5 Drawing Sheets

(56) References Cited

U.S. PATENT DOCUMENTS

| | | | |
|---|---|---|---|
| 7,065,493 B1 | 6/2006 | Homsi | 705/8 |
| 7,302,674 B1 | 11/2007 | Gladieux et al. | 717/101 |
| 7,324,108 B2 | 1/2008 | Hild et al. | 345/440 |
| 7,379,999 B1 | 5/2008 | Zhou et al. | 709/224 |
| 7,444,395 B2 | 10/2008 | Sanghvi et al. | 709/223 |
| 7,457,872 B2 | 11/2008 | Aton et al. | 709/224 |
| 7,565,643 B1 | 7/2009 | Sweet et al. | 717/121 |
| 7,624,396 B1 | 11/2009 | Isenberg | 719/314 |
| 7,668,953 B1 * | 2/2010 | Sinclair et al. | 709/224 |
| 7,673,335 B1 | 3/2010 | Chakravarty et al. | 726/11 |
| 7,899,935 B2 | 3/2011 | Zhu et al. | 709/246 |
| 7,926,099 B1 | 4/2011 | Chakravarty et al. | 726/13 |
| 2002/0087220 A1 | 7/2002 | Tveit et al. | 700/22 |
| 2002/0111824 A1 | 8/2002 | Grainger | 705/1 |
| 2002/0138605 A1 | 9/2002 | Hole | 709/224 |
| 2003/0135378 A1 | 7/2003 | Carlson et al. | 705/1 |
| 2003/0172166 A1 | 9/2003 | Judge et al. | 709/229 |
| 2004/0010709 A1 | 1/2004 | Baudoin et al. | 713/201 |
| 2004/0015497 A1 | 1/2004 | Swarna et al. | |
| 2004/0138970 A1 | 7/2004 | Ramachandran et al. | |
| 2004/0139166 A1 | 7/2004 | Collison | 709/207 |
| 2005/0005017 A1 | 1/2005 | Ptacek et al. | 709/229 |
| 2005/0086502 A1 | 4/2005 | Rayes et al. | 713/189 |
| 2005/0160134 A1 | 7/2005 | Childress et al. | 709/200 |
| 2005/0222811 A1 | 10/2005 | Jakobson et al. | |
| 2005/0228685 A1 * | 10/2005 | Schuster et al. | 705/1 |
| 2005/0262215 A1 | 11/2005 | Kirov et al. | 709/207 |
| 2006/0116913 A1 | 6/2006 | Hansan et al. | 705/4 |
| 2006/0130070 A1 * | 6/2006 | Graf | H04L 41/0631 719/318 |
| 2007/0047439 A1 | 3/2007 | An et al. | 370/231 |
| 2007/0180490 A1 | 8/2007 | Renzi et al. | 726/1 |
| 2007/0192853 A1 | 8/2007 | Shraim et al. | 726/22 |
| 2007/0192862 A1 | 8/2007 | Vermeulen et al. | 726/23 |
| 2007/0288253 A1 * | 12/2007 | Cobb et al. | 705/1 |
| 2008/0016502 A1 | 1/2008 | Henderson et al. | |
| 2008/0047009 A1 | 2/2008 | Overcash et al. | |
| 2008/0103857 A1 * | 5/2008 | Yankovich et al. | 705/7 |
| 2008/0288330 A1 * | 11/2008 | Hildebrand et al. | 705/10 |
| 2009/0276843 A1 * | 11/2009 | Patel | H04L 12/2602 726/13 |
| 2010/0049559 A1 * | 2/2010 | Carbone et al. | 705/7 |

* cited by examiner

Figure 3b

SYSTEM AND METHOD FOR AUDITING GOVERNANCE, RISK, AND COMPLIANCE USING A PLUGGABLE CORRELATION ARCHITECTURE

CROSS-REFERENCE TO RELATED APPLICATIONS

This application claims the benefit of U.S. Provisional Patent Application Ser. No. 61/148,557, entitled "System and Method for Auditing Governance, Risk, and Compliance Using a Pluggable Correlation Architecture," filed Jan. 30, 2009, the entirety of which is hereby incorporated by reference.

FIELD OF THE INVENTION

The invention relates to a system and method for auditing governance, risk, and compliance using a pluggable correlation architecture, and in particular, to providing one or more utilities for designing and managing packages of correlation rules, dynamic lists, and workflows into solutions that address common regulatory concerns, business problems, and other governance, risk, and compliance controls.

BACKGROUND OF THE INVENTION

The governance, risk, and compliance (GRC) market has recently experienced significant growth as organizations seek to manage internal and external security threats, enforce internal policies, and comply with governmental regulations. For example, government agencies have faced significant challenges in implementing procedures to comply with regulations such as Homeland Security Presidential Directive (H.S.P.D.) 12, which provides a mandatory federal policy for establishing a common identification standard for federal employees and contractors. In this regard, H.S.P.D. 12 reflects an emerging trend in which GRC transcends mere information technology security in favor of a layered deterrence mechanism that can add security and ensure compliance for various areas of an organizational infrastructure.

As a result, organizations often have to sort through large amounts of data to ensure compliance with governmental regulations, internal controls or policies, risk strategies, or other security and compliance concerns. Thus, various solutions have emerged for correlating organizational data to provide policy enforcement and threat remediation by applying logic or rules to incoming data. However, existing solutions tend to focus on ensuring compliance with specific controls, regulations, or other policies for which the solutions were particularly tailored. Thus, in many cases, a given organization may have to deploy various different correlation engines to ensure compliance across distinct areas or organizational boundaries (e.g., separate correlation engines may provide correlation solutions to remediate intrusion detection, data integrity, network security, regulatory compliance, internal policies, or other governance, security, and compliance policies).

Thus, although many organizations require data correlation for a broad number of systems or applications, existing solutions tend to take a divide-and-conquer approach towards correlation. That is, existing correlation solutions tend to be limited to performing specific and isolated types of correlation, thus falling short in providing a comprehensive and future-proof correlation solution. However, governmental regulations, internal risk management strategies, and security threats often change on a continuing, ongoing, and dynamic basis, such that existing correlation solutions that operate in isolation may not adequately address all of an organization's compliance needs. Thus, because remediation of governance, risk, and compliance controls can only be considered as strong as the weakest link in a chain, existing GRC solutions that can only perform limited types of correlation cannot provide an integrated, one-stop, future-proof solution for real-time monitoring and remediation of various different governance, risk, and compliance concerns.

Existing systems suffer from these and other problems.

SUMMARY OF THE INVENTION

According to one aspect of the invention, a system and method for auditing governance, risk, and compliance using an event correlation architecture may address these and other drawbacks of existing systems. For example, an integrated correlation framework may provide improved incident management and remediation by streamlining event management and supporting multiple languages and correlation platforms, among other things. In particular, the event correlation architecture may include a solution designer for defining a solution pack that enforces one or more specific governance, risk, or compliance controls, and a solution manager for deploying the solution pack within the event correlation architecture to configure the architecture for enforcement of the one or more controls. Thus, a collection of content defined in the solution pack may be used to enrich one or more events received at the event correlation architecture, and a correlation engine may then correlate the events using the content in the solution pack to enforce the one or more governance, risk, or compliance controls (e.g., the solution packs may provide a framework for packaging content into controls designed to enforce specific business or technical policies, wherein the content may include event configurations, maps, workflows, reports, correlation rules, actions, dynamic lists, etc.).

According to one aspect of the invention, a system for auditing governance, risk, and compliance using an event correlation architecture may include a solution designer configured to enable a user to define a collection of content for a solution pack that enforces one or more governance, risk, or compliance controls, and a solution manager configured to enable the user to deploy the solution pack within the event correlation architecture. As such, the event correlation architecture may be configured to enforce the one or more governance, risk, or compliance controls in response to the solution pack being deployed within the event correlation architecture. For example, a collector manager may enrich one or more events received at the event correlation architecture using the content in the deployed solution pack, and at least one correlation engine may then correlate the enriched events using the content in the deployed solution pack to enforce the one or more governance, risk, or compliance controls. In particular, in one implementation, the enriched events may be communicated to the correlation engine, which uses one or more rules defined in the solution pack for evaluating the enriched events. In response to the correlation engine determining that the enriched events trigger at least one of the rules, one or more actions defined in the solution pack may then be initiated to enforce the relevant control (i.e., the content in the solution pack includes the actions to be initiated in response to the rules being triggered).

According to one aspect of the invention, a method for auditing governance, risk, and compliance using an event correlation architecture may include receiving a solution pack that includes a collection of content for enforcing one or more governance, risk, or compliance controls. The solution pack may then be deployed within the event correlation architecture to configure the event correlation architecture to enforce the governance, risk, or compliance controls. For example, events received at the event correlation architecture may be enriched using the content in the deployed solution pack, and at least one correlation engine may then correlate the enriched events using the content in the deployed solution pack to enforce the one or more governance, risk, or compliance controls.

According to one aspect of the invention, one or more solution packs for auditing governance, risk, and compliance controls using an event correlation architecture may be stored on computer-readable media. In particular, the solution packs may include, among other things, one or more mapping definitions or configurations defined in accordance with a taxonomy used in the event correlation architecture, wherein events received at the event correlation architecture may be enriched using the mapping definitions or configurations. The solution packs may further include rules for evaluating the enriched events to enforce the governance, risk, or compliance controls, actions to be initiated in response to the rules being triggered, and report definitions for providing information relating to enforcement of the governance, risk, or compliance controls. The solution packs may also include documentation describing appropriate steps for deploying and testing the solution pack within the event correlation architecture, whereby the solution packs may generally provide an integrated collection of content to enforce or otherwise remediate a particular governance, risk, or compliance control.

Other objects and advantages of the invention will be apparent to those skilled in the art based on the following drawings and detailed description.

DETAILED DESCRIPTION

Figure 1A:
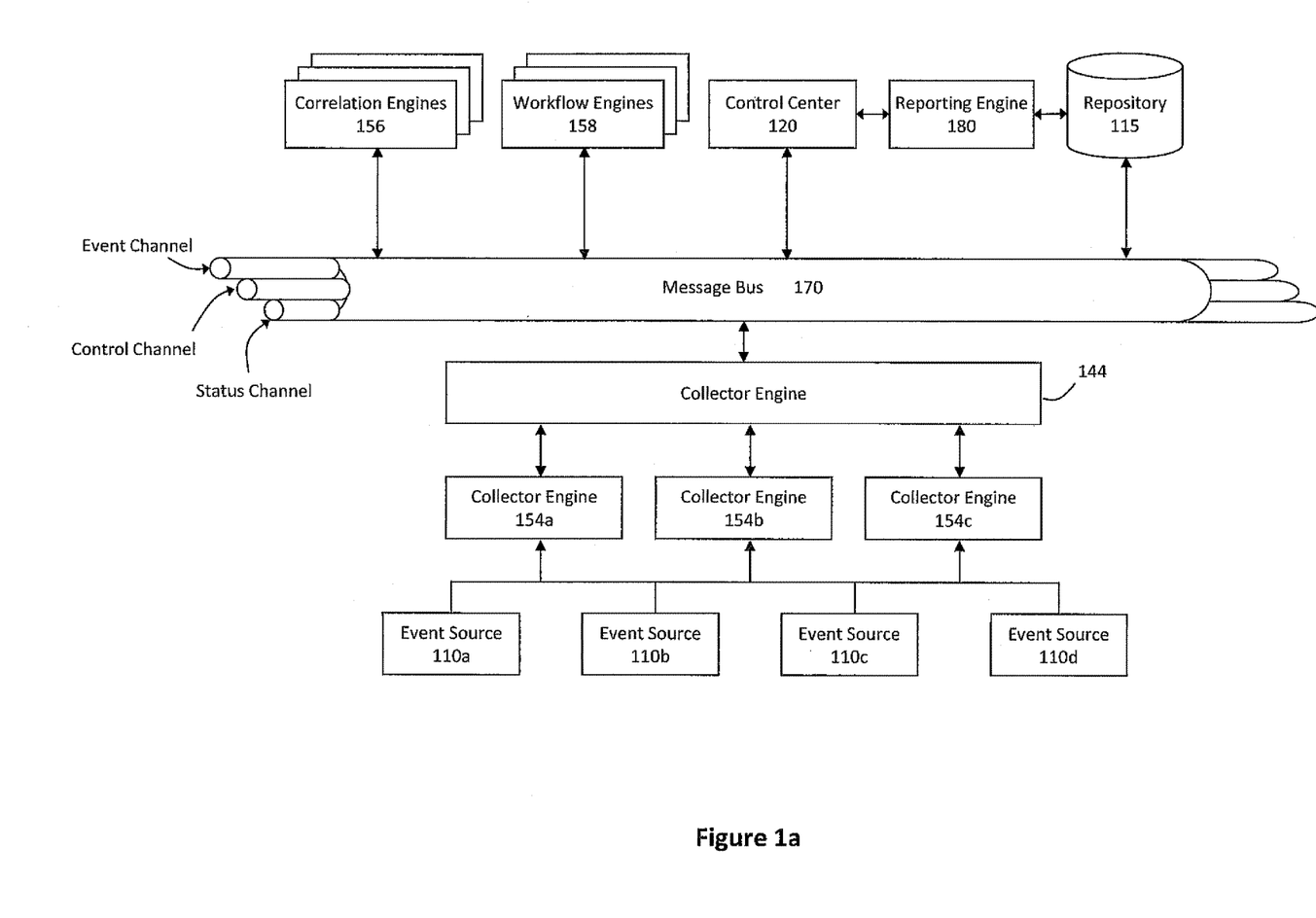
FIG. 1a illustrates a block diagram of an exemplary pluggable correlation architecture, according to one aspect of the invention.

According to one aspect of the invention, FIG. 1a illustrates an exemplary pluggable correlation architecture, which may provide an integrated solution for automating the collection, analysis, and reporting of information relating to various governance, risk, and compliance (GRC) concerns.

In one implementation, the pluggable correlation architecture shown in FIG. 1a may be based on a Service Oriented Architecture (SOA) that provides a scalable, multi-threaded, distributed, and extensible framework for incident management and threat remediation. For example, using the pluggable correlation architecture of FIG. 1a, an organization may monitor and manage various GRC functions, such as viewing event streams in real-time, detecting patterns in the event streams, correlating events using rules based on a flexible rule-based language, organizing events into incidents for response management and tracking, managing permissions associated with users, and providing reports based on analysis of real-time and historical events, among other things.

In one implementation, the pluggable correlation architecture shown in FIG. 1a may include a collector manager 144 and one or more collector engines 154 collectively configured to aggregate, parse, normalize, filter, and enrich information received from various event sources 110. For example, the event sources 110 may include any suitable combination of databases, operating systems, directories, firewalls, intrusion detection systems, antivirus applications, mainframes, application servers, or other data sources capable of generating information that can be processed into events. For example, the collector engines 154 may include one or more concentrators, multiplexed adapters, or other components configured to aggregate the information received from the various event sources 110.

In one implementation, the collector manager 144 may subsequently normalize the information aggregated by the collector engines 154 into one or more "events," wherein the collector manager 144 may further enrich the one or more events with metadata that adds business relevance to the events. In one implementation, the collector manager 144 may enrich the events using a taxonomy for consistently categorizing data that may be received from otherwise disparate event sources 110. For example, the metadata may include one or more tags that provide business-relevant context for the events (e.g., source address, destination address, destination port, severity, criticality, business unit, owner, asset value, geography, timestamp, or various other tags that provide contextual information for the events). After the events have been enriched with the metadata, the collector manager 144 may filter the events (e.g., via a global filtering service) and dispatch the events to a message bus 170, whereby other components of the architecture may utilize the further context that the collector manager 144 adds to the events.

In one implementation, the metadata used to enrich a particular event may include one or more tags that originate from an external source, wherein the event source 110 or collector engine 154 coupled to the event source 110 may explicitly establish such tags for the event. Alternatively (or additionally), the metadata used to enrich a particular event may include one or more tags that originate from a referential source, wherein such tags for the event may be computed as a function of one or more other tags using a mapping service. For example, in one implementation, a tag for a particular event may include a code that identifies a building containing an asset having a destination address mentioned as the destination address for the event (e.g., the mapping service may use a customer-defined map to compute the tag based on the destination address associated with the event).

In one implementation, the message bus 170 may employ a data-driven or event-driven model for loosely coupling services associated with various components, enabling the components to run in a stand-alone configuration or a distributed topology. In particular, the message bus 170 may be used to couple services associated with various correlation engines 156, workflow engines 158, a control center 120, a reporting engine 180, and/or data repositories 115, among other things. Thus, the message bus 170 may enable independent scaling of the various components coupled to one another via the message bus 110, while further enabling standards-based integration with any number of external applications or systems. As such, in one implementation, all of the various components of the architecture may communicate via the message bus 170, providing a redundant communication channel for sustaining high data throughput across the individual components of the architecture (e.g., the message bus 170 may include independent service channels, including an event channel, a control channel, and a status channel, enabling efficient data-driven scaling).

In one implementation, the message bus 170 may further employ the mapping service to propagate business relevance or other contextual data among the various components of the architecture, which may further enable scalability and extensibility of the architecture through the intelligent transfer of data between different components of the architecture. Furthermore, the mapping service may enable the message bus 170 to dynamically propagate information among the various components without impacting an overall load on the architecture (e.g., the mapping service may selectively push only the changes or "delta data sets" from a repository 115 to the edge or perimeter of the architecture when certain data sets or "maps" are updated).

In one implementation, events may be compressed and encrypted on the message bus 170 to securely and efficiently deliver events from the event sources 110 to the components configured to perform real-time analytics. For example, the message bus 170 may employ various queuing services to provide reliable and fault-tolerant communication (e.g., high-priority messages in transit may be queued in case of a communication path failure, wherein the queued messages may be delivered to the appropriate destinations after recovery from the failure state). Additionally, the message bus 170 may include multiple communication channels, including the event channel, control channel, and status channel, thereby reducing contention, promoting parallel processing, and providing fine-grained process control for scaling and load balancing under varying conditions. For example, information technology environments may typically vary within any given organization (e.g., the organization may have one site where many event sources 110 have low event volumes, and another site where fewer event sources 110 have high event volumes). Thus, event densities at the collector engines 154 may differ greatly in such cases, yet the message bus 170 may provide a flexible data-driven deployment model that consistently scales the disparate workloads.

In one implementation, one or more correlation engines 156 may be configured to perform real-time analysis for a data stream that includes a plurality of events. In particular, the correlation engines 156 may process a time ordered stream of events to detect patterns within the events and to further detect temporal patterns in the stream. For example, in one implementation, each event in the stream of events may be associated with a time, wherein an event source 110 that generated the event may associate the event with a time when the event was generated, or a collector engine 154 coupled to the event source 110 may associate the event with a time when the event was received at the collector engine 154. The various events in the event stream may then be reordered into a time ordered stream, which the correlation engines 156 may analyze in view of one or more rules that specify a relevant pattern to be detected in the time ordered stream of events. In one implementation, if the correlation engines 156 detect a pattern that matches one or more of the rules, a correlated event may be generated, wherein the correlated event may describe the detected pattern.

In one implementation, after the correlation engines 156 generates one or more correlated events describing a detected pattern in the stream of events, one or more workflow engines 158 may be invoked to create an incident or otherwise trigger a remediation workflow. For example, one or more of the workflow engines 158 may be invoked on incident creation and initiate workflow processes based on predefined workflow templates. The workflow engines 158 may then manage a lifecycle of the workflow processes, which may include generating one or more work items or executing one or more activities or actions, among other things. The workflow engines 158 may further store information relating to a history of completed workflow processes (e.g., in repository 115), whereby the history of the completed workflow processes may be used to audit incident responses.

In one implementation, the reporting engine 180 may be used to create reports relating to status activities, or other information associated with the pluggable correlation architecture. For example, the reporting engine 180 may create reports relating to real-time and historical vulnerabilities, wherein such reports may provide information relating to trend analysis, security status of business processes or organizational assets, attack types, targeted assets, response times and resolutions, and policy compliance violations, among others. In one implementation, the reporting engine 180 may further cross-reference real-time alert data with vulnerability and remediation information, thereby bridging the gap between incident detection and response. For example, the reporting engine 180 may provide information relating to vulnerabilities that an attack may intend to exploit, a potential effect if the attack succeeds, and one or more steps recommended to remediate the attack. As such, the reporting engine 180 may provide users with comprehensive views of information relating to the pluggable correlation architecture, including health and status information aggregated across the various components thereof.

In one implementation, the pluggable correlation architecture may further include a control center 120, which may enable users to monitor and control information and activities within the architecture. For example, as will be described in greater detail below, the control center 120 may be used to build, configure, and otherwise control various aspects of the architecture, including the collector engines 154, the collector manager 144, the correlation engines 156, the workflow engines 158, and/or the reporting engine 180, among other things.

Figure 1B:
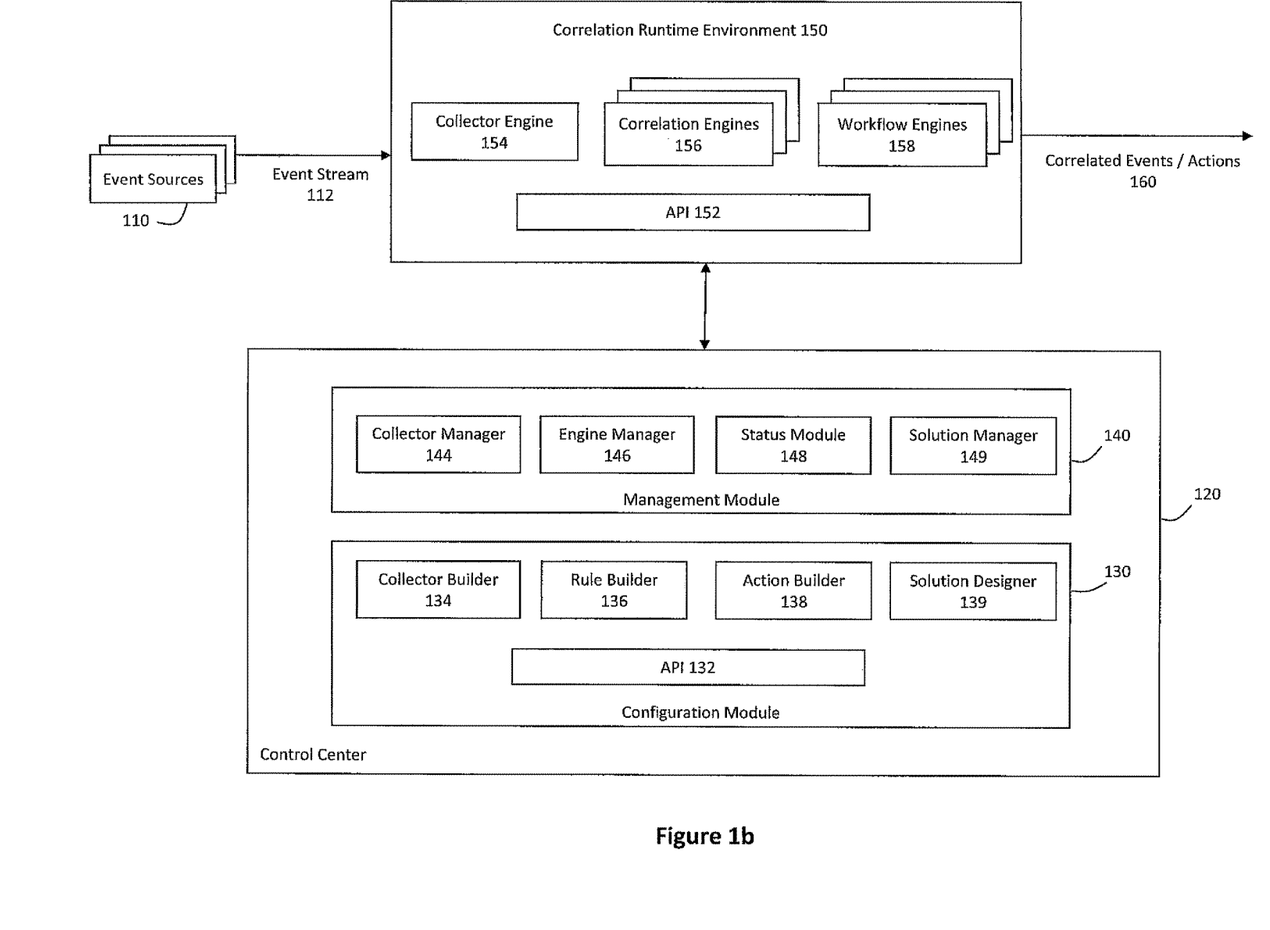
FIG. 1b illustrates a block diagram of an exemplary event correlation system based on the architecture shown in FIG. 1a, according to one aspect of the invention.

According to one aspect of the invention, FIG. 1b illustrates a block diagram of an exemplary pluggable event correlation system based on the architecture shown in FIG. 1a. In particular, the pluggable event correlation system illustrated in FIG. 1b may include a correlation runtime environment 150, among other components, which collectively provide various pluggable event correlation capabilities. Further details relating to an implementation of the pluggable event correlation system may be found in related co-pending U.S. patent application Ser. No. 12/081,540, entitled "System and Method for Correlating Events in a Pluggable Correlation Architecture," filed Apr. 17, 2008, the disclosure of which is hereby incorporated by reference in its entirety.

For example, in one implementation, the correlation runtime environment 150 may include a plurality correlation engines 156 deployed for correlating events originating from various event sources 110. As such, the pluggable event correlation system may enforce internal policies, manage security risks, and ensure regulatory compliance across an organizational information technology infrastructure. Furthermore, various aspects of the invention may enable scalability and addition of additional event correlation engines 156. For example, a new correlation engine 156 may be added to the correlation runtime 150 by configuring an input adapter to convert events into a format compatible with the new correlation engine 156, and by further configuring an output adapter to normalize outputs generated by the new correlation engine 156. Furthermore, a control center 120 may include a management module 140 having an engine manager 146, which may be used to start and/or stop one or more of the correlation engines 156, validate rules and expressions according to semantics associated with one or more of the correlation engines 156, and otherwise manage operation of one or more the correlation engines 156.

In one implementation, the control center 120 may further include a configuration module 130, which may expose an application program interface 132 to enable users to configure the correlation runtime 150. For example, in one implementation, a user may access a collector builder 134 through the application program interface 132, wherein the collector builder 134 may provide an integrated development environment for building, configuring, debugging, and otherwise developing one or more collector engines 154. As such, the collector builder 134 may enable the user to create new collector engines 154 to parse data from the event sources 110 using an interpretive language designed to handle various types of events in an event stream 112. In one implementation, the integrated development environment associated with the collector builder 134 may include a graphical user interface that enables the user to create the new collector engines 154 using a drag and drop model, thereby ensuring that the collection of data from the event sources 110 can meet both current and future requirements of an information technology environment.

In one implementation, the control center 120 may further include a collector manager 144, which may be used to manage command and control operations associated with the collector engines 154 (e.g., starting the collector engines 154, stopping the collector engines 154, etc.). Thus, the collector manager 144 may be used to manage communication between the collector engines 154 and other components of the correlation runtime environment 150 for real-time analysis, correlation computation, and incident response. For example, in one implementation, the collector manager 144 may be used to manage communication with the collector engines 154, normalize the events in the event stream 112, add business relevance to the events through a taxonomy, perform local and global filtering of events in the event stream 112, and route events and status messages to various components of the pluggable event correlation system.

In one implementation, the application program interface 132 associated with the configuration module 130 may provide the user with access to a rule builder 136 and an action builder 138, which may be used to define various rules, expressions, and associated actions for use in the correlation runtime environment 150 (e.g., the rules, expressions, and associated actions defined using the rule builder 136 and/or the action builder 138 may be deployed into the runtime environment 150 to configure operation of one or more of the correlation engines 156). The defined rules and actions may then be deployed into the runtime environment 150, wherein the deployed rules and actions may then configure remediation processes that one or more workflow engines 158 may initiate when the correlation engines 156 determine that one or more of the rules and/or expressions have been triggered. For example, the rule builder 136 may be used to define one or more rules and/or expressions to address various governance, risk, or compliance concerns (e.g., known threats, target vulnerabilities, criticalities of target assets, etc.), while the action builder 138 may be used to define remedial actions and/or responses to be taken in response to a particular rule and/or expression being triggered.

In one implementation, the rules and expressions defined via the rule builder 136 and the actions defined via the action builder 138 may be deployed into the correlation runtime environment 150 using the engine manager 146. In particular, the engine manager 146 may provide various services for managing command and control operations in the correlation runtime environment 150, including services for managing command and control operations associated with one or more of the correlation engines 156 (e.g., starting and stopping the correlation engines 156, configuring rules and/or expressions to be evaluated by the correlation engines 156, validating the rules and/or expressions according to semantics of the correlation engines 156, etc.). In addition, the various services provided by the engine manager 146 may further include services for managing command and control operations associated with the workflow engines 158 (e.g., configuring actions or other remediation responses to be initiated when one or more events trigger one or more of the rules and/or expressions evaluated by the correlation engines 156).

In one implementation, the control center 120 may further include a status module 148 configured to provide various services for reporting information relating to status, health, statistics, and/or other activity in the correlation runtime 150 (e.g., the reported information may include a number of events processed, an event processing rate, a number of rules that have fired, performance metrics, system health information, or other information relating to system health or status). For example, in one implementation, the status module 144 may periodically poll the correlation runtime environment 150 to retrieve system information relating to the Status, health, performance, or other system information (e.g., event sources 110 may provide reports on status, health, or other information, wherein the status module 144 may represent the health of connections to the event sources 110 based on accessibility of data provided by the event sources 110). The status module 144 may collect such information for presentation to the user, giving a comprehensive view into system-wide status and health.

In operation, each of the collector engines 154 may collect events originating from one or more of a plurality of event sources 110 (e.g., network elements, databases, operating systems, directories, firewalls, intrusion detection systems, antivirus applications, mainframes, web servers, application servers, or other event-generating systems). The events collected by the collector engines 154 may then be combined into an event stream 112, which may be provided to the collector manager 144. The collector manager 144 may then parse and normalize the events in the event stream 112, and the collector manager 144 may further enrich the events with metadata according to a taxonomy that provides consistent information for categorizing the events in the event stream 112. For example, the collector manager 144 may enrich the events by adding metadata that includes one or more tags for categorizing the events into groups, adding business relevance through a policy-based taxonomy, or otherwise providing information to describe the events (e.g., source address, destination address, event type, custom fields, or other fields that provide enriching information about the events). The collector manager 144 may then filter the enriched events to eliminate irrelevant data and route the filtered events to the plurality of correlation engines 156.

In one implementation, each of the plurality of correlation engines 156 may be configured to analyze events in a particular format. As such, the correlation runtime environment 150 may include an exposed application program interface 152, which may be used to develop input adapters that the collector manager 144 can use to convert events into the appropriate formats for the various correlation engines 156. Each of the correlation engines 156 may then correlate the events according to a plurality of rules or expressions that indicate when a particular condition has occurred. In one implementation, the rules employed by a particular one of the correlation engines 156 may include predefined rules associated with the particular correlation engine 156 (e.g., a correlation engine 156 configured for intrusion detection may include predefined network security rules, while correlation engine 156 configured for compliance controls may include predefined regulatory rules). In addition, the correlation engines 156 may be further configured to evaluate one or more user-defined rules created using the rule builder 136).

When one or more of the correlation engines 156 determine that a pattern of events has caused a rule or expression to be triggered, the correlation engine 156 may generate a "correlated event" based on the triggered rule or expression. For example, a rule may result in a correlated event being generated if one or more events indicate that unauthorized use of a particular resource has occurred. In another example, the plurality of correlation engines 156 may combine operational aspects of event correlation, such that correlated events may be generated on a statistical or heuristic basis (e.g., one of the correlation engines 156 may generate a correlated event, which may then be provided as an input to other correlation engines 156). Furthermore, rules may be based on one or more contexts, such as a role-based context (e.g., patterns of unauthorized activity), an asset-based context (e.g., policy violations for certain assets), or various other contexts that may have business relevance in a particular environment. Rules may also use an event taxonomy, which allows scalability across multiple platforms, as different vendors may use different event names for similar events (e.g., a "failed login" in a UNIX environment may be equivalent to an "unsuccessful logon" in a Windows™ environment). Cross-vendor or vendor-independent rules may thus be created using a standardized event taxonomy based on common elements of events in the event stream 112.

In one implementation, the correlation engines 156 may reference one or more dynamic lists when correlating events to evaluate rules and/or expressions. The dynamic lists may generally include distributed list structures that store one or more elements, wherein the correlation engines 156 may search the elements in the dynamic lists to evaluate rules. For example, elements stored in a dynamic list may include information such as a terminated user list, a suspicious user watch list, a privileged user watch list, an authorized ports and services list, and/or an authorized server list, among other things. In one implementation, the elements stored in the dynamic list may be marked as transient or persistent, wherein transient elements may be automatically removed following a predetermined time-to-live (TTL) period, while persistent elements may remain in the dynamic list regardless of any time-to-live period. Thus, the correlation engines 156 may reference one or more of the dynamic lists when evaluating rules or expressions (e.g., a rule may be written to identify a file access event if a user who is not a member of an authorized users list attempts to access a restricted file). Additionally, actions that the workflow engines 158 initiates in response to a rule being triggered may be integrated with the dynamic lists (e.g., elements may be added or removed from a dynamic list when a given rule triggers).

In one implementation, if one or more of the correlation engines 156 generate a correlated event after a rule or expression is triggered, an output adapter associated with the correlation engine 156 that generated the correlated event may normalize the correlated event for further processing by the workflow engine 158. In particular, because the pluggable event correlation system can support correlation engines 156 that generate correlated events in distinct formats, the exposed application program interface 152 may be used to create output adapters that convert an output in the format associated with the generating correlation engine 156 into a format compatible with the workflow engines 158. One or more of the workflow engines 158 may then identify one or more remediation actions that define an appropriate response to the rule that was triggered. For example, a rule that identifies a network intrusion may be associated with an action to block a port of entry or deny access to an offending node. In another example, a rule triggered in response to a user attempting a predetermined number of failed logins within a predetermined time period may be associated with an action to temporarily disable the user's account and add the user to a dynamic list of suspicious users. In still another example, an event of a predetermined severity may trigger a rule associated with an action that alerts an administrator that an event source 110 from which the event originated may require attention or maintenance. In other instances, the workflow engine 158 may determine that no further action is to be taken for a given correlated event, wherein the correlated event may simply be logged in a repository for future reference or forwarded to other interested entities (e.g., another one of the correlation engines 156). Accordingly, the workflow engines 158 may identify any actions to be taken in response to correlated events being generated to produce an output stream 160 that defines a workflow for remediation of the correlated event (e.g., the workflow may coordinate processes for various systems and/or users to remediate the correlated event, return the correlated event to the event stream 112 for further correlation with other events or correlated events in the event stream 112, etc.).

In one implementation, the control center 120 may further include a solution designer 139 and a solution manager 149 to enable creation and management of solution packs that address specific governance, risk, and compliance problems. In particular, the solution designer 139 and the solution manager 149 may collectively provide a framework for packaging content into one or more controls that are designed to enforce a specific business or technical policy. The controls may use any of the features for detecting, filtering, alerting, correlating, and otherwise responding to activity in the event correlation system, in addition to providing documentation relating to status and/or enforcement of the controls. For example, in one implementation, controls within a particular solution pack can include, among other things, one or more rules, actions, and dynamic lists to be deployed in the correlation runtime environment 150, reports relating to the status or health of the controls, workflows and associated roles to manage enforcement of the controls, and/or criteria for enriching events in the event stream 112 (e.g., map definitions and event metadata configurations), among other things.

In one implementation, the solution designer 139 may be used to create one or more solution packs, components of which may generally include categories, controls, content, and content groups. For example, in one implementation, the categories included in a particular solution pack may provide a conceptual classification for organizing one or more controls, which may provide a further level of classification corresponding to a particular control defined according one or more regulations. Further, each of the controls may contain one or more content groups, wherein the content in the content groups may include one or more event configurations, maps, workflows, reports, and/or correlation rules, among other things.

In one implementation, the event configuration content may contain information such as map definitions and configurations for one or more of the metadata tags associated with the taxonomy used in the pluggable event correlation system. The map content may contain one or more map definition instances (e.g., which may be referenced by the event configuration content, used by the mapping service described above, etc.). The workflow content may contain one or more workflow templates and any associated roles, wherein the workflow templates may be used to manage remediation of various actions associated with correlation rules. For example, the correlation rule content may contain correlation rules, a namespace associated with the correlation rule (e.g., to associate the correlation rule with a particular correlation engine 156), and any actions or dynamic lists associated with the correlation rule.

Thus, as will be described in greater detail below with reference to FIG. 3a, solution packs, which may be predefined and/or created using the solution designer 139, may generally include a collection of packaged content providing a framework for enforcing one or more governance, risk, and compliance controls. Further, as will be described in greater detail below with reference to FIG. 3b, the solution manager 149 may then be used to deploy, test, and otherwise manage the solution packs within the correlation runtime environment 150 (e.g., users may generate detailed reports using the solution manager 149 to view implementation status for the controls, manage enforcement of the controls, etc.).

Figure 2:
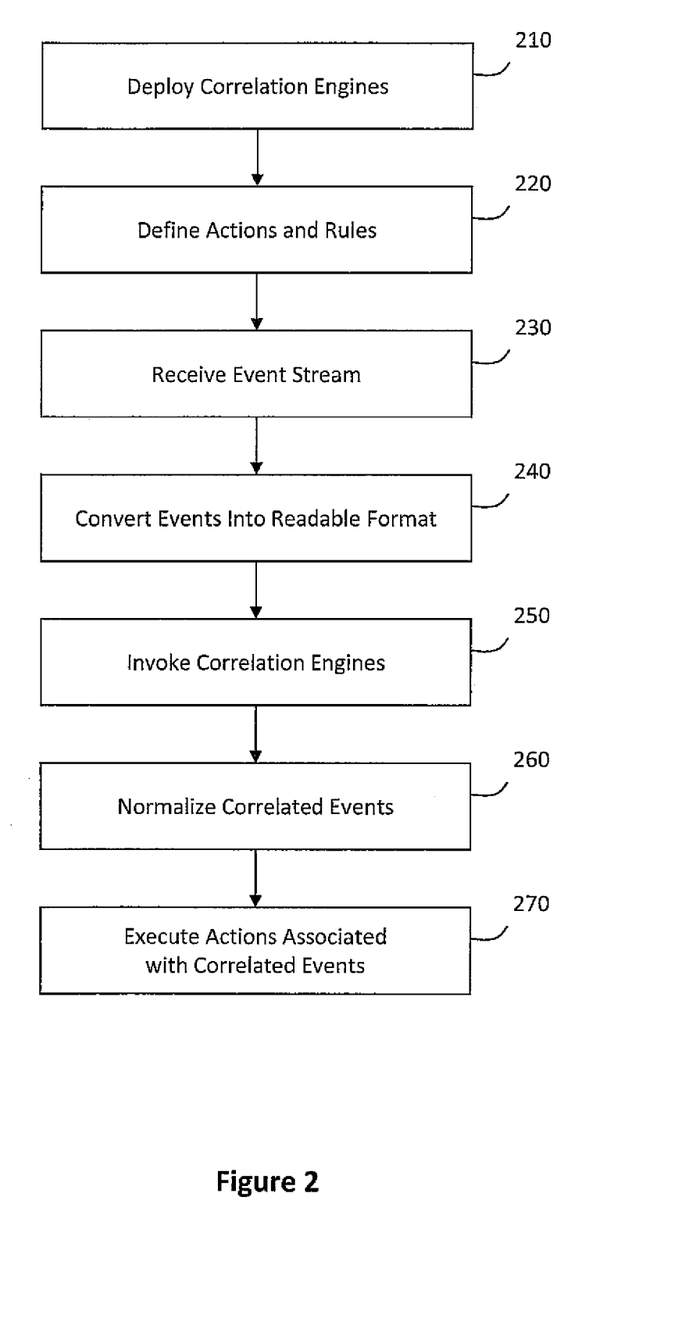
FIG. 2 illustrates a flow diagram of an exemplary process for correlating events in a system based on the pluggable correlation architecture shown in FIG. 1a, according to one aspect of the invention.

According to one aspect of the invention, FIG. 2 illustrates a flow diagram of an exemplary process for correlating events in a pluggable event correlation system based on the architecture shown in FIG. 1a. The process illustrated in FIG. 2 may begin in an operation 210, where a plurality of correlation engines may be deployed into a correlation runtime environment. The deployed correlation engines may include various rules for determining when a given sequence or pattern of events should cause a correlated event to be generated.

Subsequently, in an operation 220, a user may define various custom rules that define event patterns, sequences, or other criteria for determining when a correlated event should be generated. The custom rules may be associated with predefined actions (e.g., system commands or responses), or custom actions may be defined to remediate the custom rules. Moreover, custom actions may be defined in operation 220 to be associated with predefined rules associated with the correlation engines deployed in operation 210. The rules and actions defined in operation 220 may be deployed into the correlation runtime environment to configure operation of one or more of the correlation engines. In one implementation, prior to deploying the rules and actions into the runtime environment, the rules and actions may be validated according to semantic requirements of the correlation engines to ensure proper operation once deployed. As such, when the rules and actions defined in operation 220 have been validated and deployed into the runtime environment, the correlation engines deployed in operation 210 may be configured to enforce various rules, including predefined rules, custom rules, or various combinations thereof.

In an operation 230, an event stream containing a plurality of events may be received at the correlation runtime environment. The events may originate from various event sources (e.g., network nodes, devices, applications, etc.), and may be processed for analysis by the plurality of engines. For example, in a subsequent operation 240, the events in the event stream may be converted into one or more formats that can be read by the plurality of correlation engines. In particular, the plurality of correlation engines may accepts events to be correlated in various distinct formats. As such, in operation 240, the events in the event stream may be collected and filtered (e.g., to eliminate irrelevant data) prior to being normalized and enriched with information having business relevance (e.g., information describing the event, an originating event source, a policy to apply to the event, or other information). For example, in one implementation, a collector manager may be configured to convert the enriched event stream into formats that can be used by each of the correlation engines.

The plurality of correlation engines may thus be invoked in an operation 250 to correlate the converted events. Each of the correlation engines may evaluate the event stream in view of the rules that have been deployed in the correlation runtime environment for the particular correlation engine, including predefined rules, custom rules, or various combinations thereof. When a correlation engine determines in operation 250 that a given rule has been triggered, a correlated event may be generated and the runtime environment may take further action to process the correlated event. For example, as the correlation engines may use various distinct formats, the correlated events generated thereby may be in various distinct formats. However, remedial actions deployed in the runtime environment may be associated with correlated events per a normalized event format. Thus, in one implementation, an operation 260 may include normalizing the correlated events generated by the various correlation engines, such that a subsequent operation 270 may determine whether the correlated events have any actions associated therewith (e.g., a correlated event generated when a given rule triggers may be associated with a predetermined remedial action). Thus, if any actions are associated with the correlated events, the associated actions may be executed in operation 270 to initiate the remedial action.

Figure 3A:
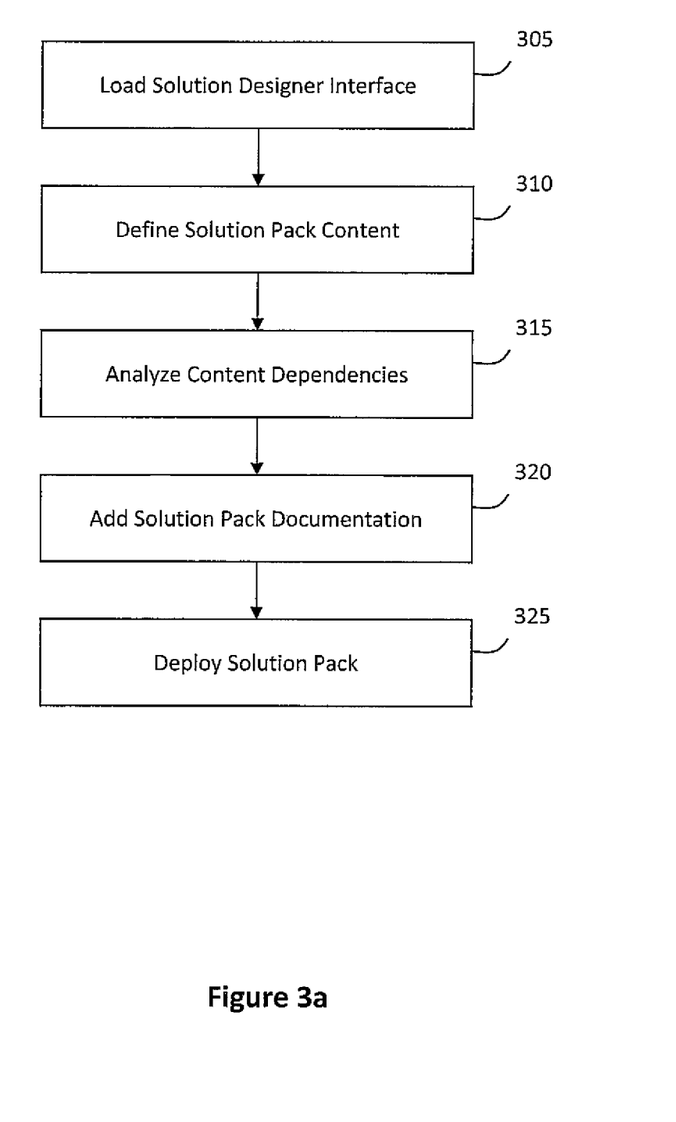
FIG. 3a illustrates a flow diagram of an exemplary process for designing solution packages that address common regulatory concerns, business problems, and other governance, risk, and compliance controls, according to one aspect of the invention.

According to one aspect of the invention, FIG. 3a illustrates a flow diagram of an exemplary process for designing solution packages that address common regulatory concerns, business problems, and other governance, risk, and compliance controls. The process for designing solution packages may be used in a pluggable event correlation system, wherein the process may be initiated in an operation 305 when a user of the pluggable event correlation system loads a solution designer interface. In one implementation, the pluggable event correlation system may be configured to restrict access to the solution designer interface, wherein users may be required to have certain permissions in order to load the solution designer interface in operation 305. After the solution designer interface has been loaded (e.g., by an authorized user), the solution designer interface may then be used to select, package, and export various types of content that address particular governance, risk, and compliance controls (e.g., a solution pack may include correlation rules, actions, dynamic lists, reports, and/or other information to address governance, risk, and compliance for a specific control).

For example, the Payment Card Industry Security Standard Council has established the Payment Card Industry Data Security Standard (PCI DSS) to provide technical and operational requirements for processing card payments in a manner that prevents credit card fraud, hacking, and other security vulnerabilities. In particular, the PCI DSS includes requirements relating to building and maintaining a secure network infrastructure, protecting cardholder data, maintaining a vulnerability management program, regularly monitoring and testing the network infrastructure, and maintaining an information security policy, among other things. Thus, in one implementation, a PCI DSS solution pack may be used to provide the pluggable event correlation system with an integrated collection of content to address one or more of these requirements (e.g., content to track firewall changes and/or unauthorized firewall administration, restrict access to demilitarized zones from PCI systems, protect cardholder data, provide identity management for user accounts, provide an audit trail for activity in the PCI systems, limit access to the audit trail according to business needs, protect the audit trail from unauthorized changes, and/or provide alerts for changes to the audit trail). Further, it will be apparent that the specific content and controls implemented in the PCI DSS solution pack may vary depending on the requirements and needs of a particular organization, and that other solution packs may be implemented to address additional industry standards or other specific governance, risk, and compliance controls.

Thus, in one implementation, after the solution designer interface has been loaded in operation 305, the user may define the content to be included in a particular solution pack in an operation 310, wherein the content for the solution pack may be defined in either an offline mode or a connected mode. For example, in the offline mode, the solution designer interface may be disconnected from active components and/or content of the pluggable event correlation system (e.g., active workflows, event enrichment, correlation rules, and other components and content may generally be unavailable to the user in the offline mode). Nonetheless, the user may define a structure of the solution pack in the offline mode, including categories, controls, and/or placeholders for content to be subsequently added to the solution pack, and may further write documentation for implementing and/or testing the solution pack, add reports available in local systems, and attach information to nodes of the solution pack (e.g., sample report images, sample mapping data for enriching events, scripts for actions to be executed in association with correlation rules, etc.). In the connected mode, the user may access any component and/or content associated with the pluggable event correlation system, whereby the connected mode may enable the user to replace content placeholders added in the offline mode, and may further enable the user to add content associated with the pluggable event correlation system to the solution pack.

In one implementation, an operation 315 may then include analyzing dependencies for the various content objects previously defined for the solution pack in operation 310. For example, in one implementation, analyzing the content dependencies may include determining whether the solution pack content defined in operation 310 includes one or more components that are dependent upon one another, and then automatically adding, removing, and/or modifying the solution pack content to ensure that the dependent components are included in the solution pack. For example, in one implementation, the content defined in operation 310 may include a correlation rule deployment with dependencies including a correlation rule definition, one or more actions, and an ability to create an incident using a workflow. As such, analyzing the content dependencies in operation 315 may include adding the correlation rule definition, the associated correlation actions, a template for the workflow, and any roles associated with the workflow to the solution pack.

In one implementation, after the content has been defined for the solution pack and after the dependencies have been resolved for the content defined for the solution pack, the user may add documentation to the solution pack in an operation 320. The documentation for a particular solution pack may include one or more implementation steps providing instructions for implementing the solution pack content in the pluggable event correlation system. For example, the implementation steps defined within the documentation for a solution pack may include, among other things, populating one or more files that the mapping service may use to enrich events, scheduling automatic execution of reports included in the solution pack, enabling auditing of event sources, and/or copying scripts configured to execute actions associated with correlation rules to one or more correlation engines.

In addition, because content associated with a solution pack should generally be tested to ensure that the content works as expected, the documentation added in operation 320 may further include one or more steps required to test the content in the pluggable event correlation system. For example, in one implementation, the testing steps defined within the documentation for a solution pack may include generating a failed login in a high-value server and verifying that one or more correlation engines properly generate a correlated event and assign the correlated event to a workflow.

In one implementation, after the solution pack content has been defined and the appropriate documentation has been added to the solution pack, the solution pack may be deployed into the pluggable event correlation system in an operation 325. In particular, according to one aspect of the invention, FIG. 3b illustrates a flow diagram of an exemplary process for managing solution packages that address common regulatory concerns, business problems, and other governance, risk, and compliance controls, wherein the process shown in FIG. 3b may be used to deploy solution packs into the pluggable event correlation system.

Figure 3B:
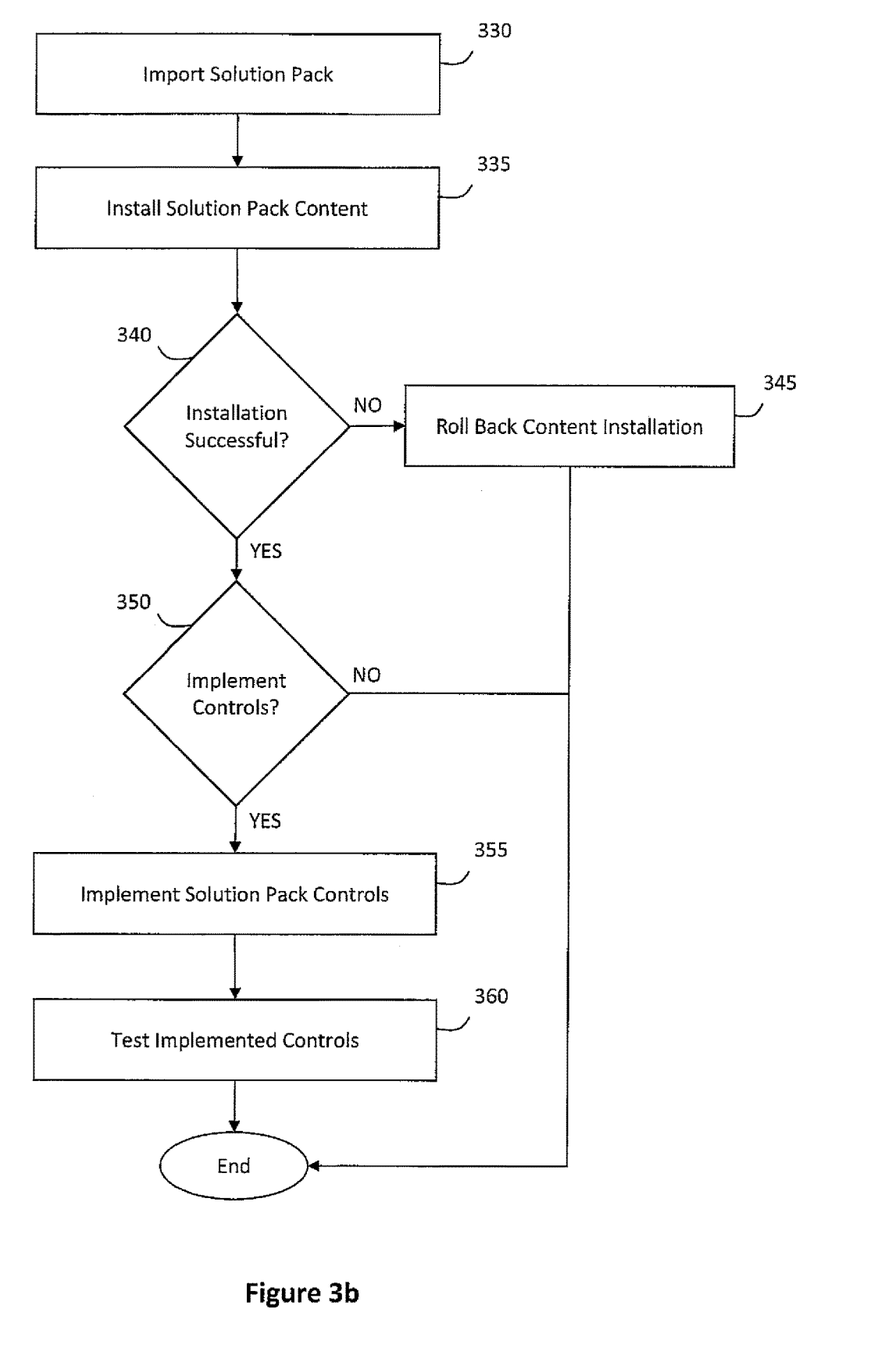
FIG. 3b illustrates a flow diagram of an exemplary process for managing solution packages that address common regulatory concerns, business problems, and other governance, risk, and compliance controls, according to one aspect of the invention.

For example, in one implementation, the process shown in FIG. 3b may be initiated in an operation 330 when a user of the pluggable event correlation system loads a solution manager interface, wherein the solution manager interface may be used to install, implement, and test the controls defined in a particular solution pack. In one implementation, the pluggable event correlation system may be further configured to restrict access to the solution manager interface, wherein users may be required to have certain permissions in order to load the solution manager interface prior to importing a solution pack in operation 330.

In one implementation, the solution packs imported in operation 330 may originate from various sources, wherein predefined solution packs may be received from one or more vendors or partners (e.g., according to terms of a license with the vendors or partners), or the solution packs may be created using the solution designer, as described above with reference to FIG. 3a. When a particular solution pack is imported in operation 330, one or more data access service (DAS) components may be installed on an appropriate server, thereby enabling subsequent installation and implementation of one or more controls contained in the imported solution pack.

In one implementation, following importation of the solution pack in operation 330, an operation 335 may include installing the content included in the solution pack. For example, in one implementation, installing the solution pack content may include, among other things, comparing the content included in the solution pack to content included in different solution packs and/or earlier versions of the solution pack. As such, if the solution pack imported in operation 330 includes an updated version of an earlier version of the solution pack, operation 335 may include prompting a user to replace the content of the pre-existing version of the solution pack with the content of the updated version. Further, if any content included in the solution pack is already installed in the pluggable event correlation system, operation 335 may identify that content as being installed. Alternatively (or additionally), if a different version of the content is already installed in the pluggable event correlation system (e.g., which may identified based on a difference in name, definition, description, etc.), operation 335 may include triggering an out of sync status to resolve the discrepancy. To resolve the out of sync content, the user may uninstall any controls associated with the out of sync content and then reinstall a control having the content to be used in the system.

In one implementation, installing the content included in the solution pack may configure the event correlation system to enforce the controls associated with the solution pack. As such, operation 335 may further include the user installing all of the content associated with the solution pack or one or more of the controls associated with the solution pack. When a solution pack or individual controls are installed in operation 335, any child nodes relating to the installed content may also be installed. However, only fully defined controls can be installed in operation 335, whereby any content placeholders in a particular solution pack cannot be installed until defined content replacing the placeholders. If the installed content includes one or more correlation rules and/or associated actions, installing such content may include deploying the content to one or more particular correlation engines. If one or more actions are associated with the deployed correlation rules, the actions may be deployed to all correlation engines (i.e., all of the correlation engines should be capable of invoking the action upon determining that the associated correlation rule has been triggered).

After the content has been installed, a subsequent operation 340 may determine whether the installation was successful, wherein if the installation fails for any of the content associated with a particular control, an operation 345 may include rolling back the installation of all of the content in that control. If the installation was successful, a determination may then made in an operation 350 regarding whether or not to implement one or more of the controls defined in the solution pack (i.e., the controls may not be enforced until the associated content is installed and the control is implemented). As such, if a user does not choose to implement any controls, the process may end, otherwise one or more of the controls may then be implemented in an operation 355 (i.e., implementing a control may refer to the process of configuring event sources and the pluggable event correlation system to use the content associated with the control).

For example, in one implementation, implementing the controls may include steps such as populating a file used by the mapping service to enrich events, scheduling automatic report execution, enabling auditing of event sources, copying scripts for executing actions associated with correlation rules to appropriate correlation engines, or other steps for implementing a particular control. As described above, solution packs may generally include documentation describing one or more steps for implementing the controls included therein, such that the user may follow the steps in the implementation documentation to implement the solution pack controls in operation 355. The implemented controls may then be tested in a subsequent operation 360, wherein testing the controls may verify that the content associated with the control functions properly in the pluggable event correlation system. As in the case of implementing a control, solution packs may generally include documentation describing one or more steps for testing the controls included therein, such that the user may follow the steps in the testing documentation to test the solution pack controls in operation 360. For example, in one implementation, testing the controls may include steps such as running a report, generating one or more events to ensure that a correlation event is properly generated and assigned to a workflow, or other steps for testing a particular control. Once the content for a control has been installed and the control has been implemented and tested, the control may be identified as active within the pluggable event correlation system, wherein the system may enforce the governance, risk, or compliance control addressed therein.

Implementations of the invention may be made in hardware, firmware, software, or various combinations thereof. The invention may also be implemented as instructions stored on a machine-readable medium, which may be read and executed by one or more processors. A machine-readable medium may include various mechanisms for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic has been described in connection with an aspect or implementation, it will be understood that such feature, structure, or characteristic may be included in connection with other aspects or implementations, whether or not explicitly described. Thus, various changes and modifications may be made to the preceding description without departing from the scope or spirit of the invention, and the specification and drawings should therefore be regarded as exemplary only, and the scope of the invention determined solely by the appended claims.

What is claimed is:

1. A method for auditing computer network security risk using an event correlation architecture, comprising:
    executing, by a computer system, a correlation runtime environment having an extensible service-oriented architecture and comprising a collection manager configured to enforce intrusion detection, data integrity, and network security controls;
    deploying a set of two or more correlation engines into the correlation runtime environment, the set of two or more correlation engines comprising:
        an intrusion detection correlation engine configured to evaluate an event stream in a first format according to first semantics and in view of predefined network security rules; and
        a compliance correlation engine configured to evaluate the event stream in a second format according to second semantics and in view of predefined regulatory rules;
    collecting, by the computer system through the collection manager, information from each of a plurality of disparate sources;
    adding, by the computer system through the collection manager, metadata to the collected information, the metadata defining the respective business relevance for each event of a plurality of events corresponding to the collected information and normalizing the collected information across the plurality of disparate sources into event information based at least partially on a policy-based taxonomy categorizing the collected information as corresponding to one or more events of the plurality of events, wherein the respective business relevance is based at least partially on one or more metadata tags identifying an asset value for the respective event of the plurality of events;
    exposing an application program interface by execution of a configuration module to facilitate pluggable event correlation at least partially by user-customization of the correlation runtime environment via execution of:
        a rule builder receiving rule definitions via the exposed application program interface to define expressions associated with a plurality of rules;
        an action builder receiving action definitions to define actions associated with correlated events;
        the rule builder and the action builder defining rules, expressions, and associated actions based at least partially on the rule definitions and the actions associated with the correlated events via the exposed application program interface, the defined rules and the defined expressions representing patterns of events relating to relationships among events and comprising:
            a first subrule that includes a first filtering expression defined to trigger when a first event of the plurality of events occurs, wherein the first filtering expression comprises determining whether the event information indicates that a severity threshold or a criticality requirement is satisfied for the first event of the plurality of events;
            a second subrule that includes a second filtering expression defined to trigger when a second event occurs, wherein the second filtering expression is different from the first filtering expression;
            a rule contingent on the first subrule and the second subrule, the rule builder facilitating definition of an aggregate rule to trigger upon repeat subrule triggers a specified number of times in a specified time period, a composite rule to trigger upon different subrule triggers within the specified time period, and a sequence rule to trigger upon subrule triggering in a specified sequence;
    deploying the defined rules, the defined expressions, and the defined associated action into the correlation runtime environment so that the set of two or more correlation engines are further configured to evaluate the defined expressions associated with the plurality of rules to determine whether the event stream includes one or more events occur in a predetermined pattern;
    converting, by the computer system through the collection manager using one or more input adapters, the event information corresponding to the plurality of events into different formats, each having different semantics, used by the set of two or more correlation engines, the different formats comprising the first format according to first semantics and the second format according to second semantics;
    correlating, by the computer system through the set of two or more correlation engines, two or more events of the plurality of events based at least partially on the predefined network security rules, the predefined regulatory rules, the defined expressions associated with the plurality of rules, the event information in the different semantic formats, and the metadata added to each event, and determining that the rule contingent on the first subrule and the second subrule has been triggered;
    converting, by the computer system through the collection manager using one or more output adapters, an output, corresponding to the correlated two or more events and the actions defined with the action builder, from one or more of the different formats having the different semantics into another distinct format used by a set of one or more workflow engines;
    generating, by the computer system through the set of one or more workflow engines, a remediation workflow responsive to the output, the remediation workflow to coordinate processes for threat remediation and the remediation workflow specifies the actions defined with the action builder; and
    executing, by the computer system, the actions specified by the remediation workflow to enforce the network security controls, the one or more actions corresponding to denying access to a node or disabling a user account.

2. The method of claim 1, further comprising correlating the filtered event information to content in a deployed solution pack at least in part by:
    correlating each of the plurality of events with the one or more rules based on the metadata added to each event, the one or more rules comprising rules for evaluating patterns in the events; and
    initiating one or more actions of at least one rule of the one or more rules in response to the correlation engine determining that at least one of the events of the filtered event information triggers the at least one rule.

3. The method of claim 1, further comprising generating, by the computer system, one or more reports, wherein the reports generated provide information relating to enforcement of one or more of the intrusion detection, the data integrity, and/or the network security controls.

4. A system comprising:
a processor; and
a memory coupled with the processor and storing a set of instructions which, when executed by the processor, causes the processor to audit computer network security risk, using an event correlation environment by:
executing a correlation runtime environment having an extensible service-oriented architecture and comprising a collection manager configured to enforce governance, risk, and compliance controls;
deploying a set of two or more correlation engines into the correlation runtime environment, the set of two or more correlation engines comprising:
an intrusion detection correlation engine configured to evaluate an event stream in a first format according to first semantics and in view of predefined network security rules; and
a compliance correlation engine configured to evaluate the event stream in a second format according to second semantics and in view of predefined regulatory rules;
collecting through the collection manager information from each of a plurality of disparate sources;
adding, through the collection manager, metadata to the collected information, the metadata defining the respective business relevance for each event of a plurality of events corresponding to the collected information and normalizing the collected information across the plurality of disparate event sources into event information based at least partially on a policy-based taxonomy categorizing the collected information as corresponding to one or more events of the plurality of events, wherein the respective business relevance is based at least partially on one or more metadata tags identifying an asset value for the respective event of the plurality of events;
exposing an application program interface by execution of a configuration module to facilitate pluggable event correlation at least partially by user-customization of the correlation runtime environment via execution of:
a rule builder receiving rule definitions via the exposed application program interface to define expressions associated with a plurality of rules;
an action builder receiving action definitions to define actions associated with correlated events;
the rule builder and the action builder defining rules, expressions, and associated actions based at least partially on the rule definitions and the actions associated with the correlated events via the exposed application program interface, the defined rules and the defined expressions representing patterns of events relating to relationships among events and comprising:
a first subrule that includes a first filtering expression defined to trigger when a first event of the plurality of events occurs, wherein the first filtering expression comprises determining whether the event information indicates that a severity threshold or a criticality requirement is satisfied for the first event of the plurality of events;
a second subrule that includes a second filtering expression defined to trigger when a second event occurs, wherein the second filtering expression is different from the first filtering expression;
a rule contingent on the first subrule and the second subrule, the rule builder facilitating definition of an aggregate rule to trigger upon repeat subrule triggers a specified number of times in a specified time period, a composite rule to trigger upon different subrule triggers within the specified time period, and a sequence rule to trigger upon subrule triggering in a specified sequence;
deploying the defined rules, the defined expressions, and the defined associated action into the correlation runtime environment so that the set of two or more correlation engines are further configured to evaluate the defined expressions associated with the plurality of rules to determine whether the event stream includes one or more events occur in a predetermined pattern;
converting, through the collection manager using one or more input adapters, the event information corresponding to the plurality of events into different formats, each having different semantics, used by the set of two or more correlation engines, the different formats comprising the first format according to first semantics and the second format according to second semantics;
correlating, through the set of two or more correlation engines, two or more events of the plurality of events based at least partially on the predefined network security rules, the predefined regulatory rules, the defined expressions associated with the plurality of rules, the event information in the different semantic formats, and the metadata added to each event, and determining that the rule contingent on the first subrule and the second subrule has been triggered;
converting, through the collection manager using one or more output adapters, an output corresponding to the correlated two or more events and the actions defined with the action builder, from one or more of the different formats having the different semantics into another distinct format used by a set of one or more workflow engines;
generating, through the set of one or more workflow engines, a remediation workflow responsive to the output, the remediation workflow to coordinate processes for threat remediation and the remediation workflow specifies the actions defined with the action builder; and
executing the one or more actions specified by the remediation workflow to enforce the network security controls, the one or more actions corresponding to denying access to a node or disabling a user account.

5. The system of claim 4, further comprising correlating the event information to content in a deployed solution pack at least in part by:
correlating each of the plurality of events with the one or more rules based on the metadata added to each event, the one or more rules comprising rules for evaluating patterns in the events; and
initiating one or more actions of at least one rule of the one or more rules in response to the correlation engine determining that at least one of the events of the event information triggers the at least one rule.

6. The system of claim 4, further comprising generating one or more reports, wherein the reports generated provide information relating to enforcement of one or more of intrusion detection, data integrity, and/or the network security controls.

7. A non-transitory, computer-readable memory device storing a set of instructions which, when executed by a processor, causes the processor to audit computer network security risk using an event correlation architecture by:
  executing a correlation runtime environment having an extensible service-oriented architecture and comprising a collection manager configured to enforce one or more governance, risk, and compliance controls;
  deploying a set of two or more correlation engines into the correlation runtime environment, the set of two or more correlation engines comprising:
    an intrusion detection correlation engine configured to evaluate an event stream in a first format according to first semantics and in view of predefined network security rules; and
    a compliance correlation engine configured to evaluate the event stream in a second format according to second semantics and in view of predefined regulatory rules;
  collecting through the collection manager information from each of a plurality of disparate sources;
  adding, through the collection manager, metadata to the collected information, the metadata defining the respective business relevance for each event of a plurality of events corresponding to the collected information and normalizing the collected information across the plurality of disparate event sources into event information based at least partially on a policy-based taxonomy categorizing the collected information as corresponding to one or more events of the plurality of events, wherein the respective business relevance is based at least partially on one or more metadata tags identifying an asset value for the respective event of the plurality of events;
  exposing an application program interface by execution of a configuration module to facilitate pluggable event correlation at least partially by user-customization of the correlation runtime environment via execution of:
    a rule builder receiving rule definitions via the exposed application program interface to define expressions associated with a plurality of rules;
    an action builder receiving action definitions to define actions associated with correlated events;
    the rule builder and the action builder defining rules, expressions, and associated actions based at least partially on the rule definitions and the actions associated with the correlated events via the exposed application program interface, the defined rules and the defined expressions representing patterns of events relating to relationships among events and comprising:
      a first subrule that includes a first filtering expression defined to trigger when a first event of the plurality of events occurs, wherein the first filtering expression comprises determining whether the event information indicates that a severity threshold or a criticality requirement is satisfied for the first event of the plurality of events;
      a second subrule that includes a second filtering expression defined to trigger when a second event occurs, wherein the second filtering expression is different from the first filtering expression;
      a rule contingent on the first subrule and the second subrule, the rule builder facilitating definition of an aggregate rule to trigger upon repeat subrule triggers a specified number of times in a specified time period, a composite rule to trigger upon different subrule triggers within the specified time period, and a sequence rule to trigger upon subrule triggering in a specified sequence;
  deploying the defined rules, the defined expressions, and the defined associated action into the correlation runtime environment so that the set of two or more correlation engines are further configured to evaluate the defined expressions associated with the plurality of rules to determine whether the event stream includes one or more events occur in a predetermined pattern;
  converting, through the collection manager using one or more input adapters, the event information corresponding to the plurality of events into different formats, each having different semantics, used by the set of two or more correlation engines, the different formats comprising the first format according to first semantics and the second format according to second semantics;
  correlating, through the set of two or more correlation engines, two or more events of the plurality of events based at least partially on the predefined network security rules, the predefined regulatory rules, the defined expressions associated with the plurality of rules, the event information in the different semantic formats, and the metadata added to each event, and determining that the rule contingent on the first subrule and the second subrule has been triggered;
  converting, through the collection manager using one or more output adapters, an output corresponding to the correlated two or more events and the actions defined with the action builder, from one or more of the different formats having the different semantics into another distinct format used by a set of one or more workflow engines;
  generating, through the set of one or more workflow engines, a remediation workflow responsive to the output, the remediation workflow to coordinate processes for threat remediation and the remediation workflow specifies the actions defined with the action builder; and
  executing the actions specified by the remediation workflow to enforce the network security controls, the one or more actions corresponding to denying access to a node or disabling a user account.

8. The non-transitory, computer-readable memory device of claim 7, wherein the auditing comprises:
  correlating the event information to content in a deployed solution pack at least in part by:
    correlating each of the plurality of events with the one or more rules based on the metadata added to each event, the one or more rules comprising rules for evaluating patterns in the events; and
    initiating one or more actions of at least one rule of the one or more rules in response to the correlation engine determining that at least one of the events of the filtered event information triggers the at least one rule.

9. The non-transitory, computer-readable memory device of claim 7, wherein the auditing comprises generating one or more reports, wherein the reports generated provide information relating to enforcement of one or more of intrusion detection, data integrity, and/or the network security controls.

* * * * *

UNITED STATES PATENT AND TRADEMARK OFFICE
CERTIFICATE OF CORRECTION

| | | |
|---|---|---|
| PATENT NO. | : 10,057,285 B2 | Page 1 of 1 |
| APPLICATION NO. | : 12/424428 | |
| DATED | : August 21, 2018 | |
| INVENTOR(S) | : Choudhary et al. | |

It is certified that error appears in the above-identified patent and that said Letters Patent is hereby corrected as shown below:

In the Specification

In Column 5, Line 8, delete "110," and insert -- 170, --, therefor.

In Column 8, Line 50, delete "Status," and insert -- status, --, therefor.

Signed and Sealed this
Ninth Day of July, 2019

Andrei Iancu
*Director of the United States Patent and Trademark Office*